May 17, 1966  C. B. CRANDALL ETAL  3,251,561
BY-PASS TYPE SPOOLER
Filed March 4, 1964  3 Sheets-Sheet 2
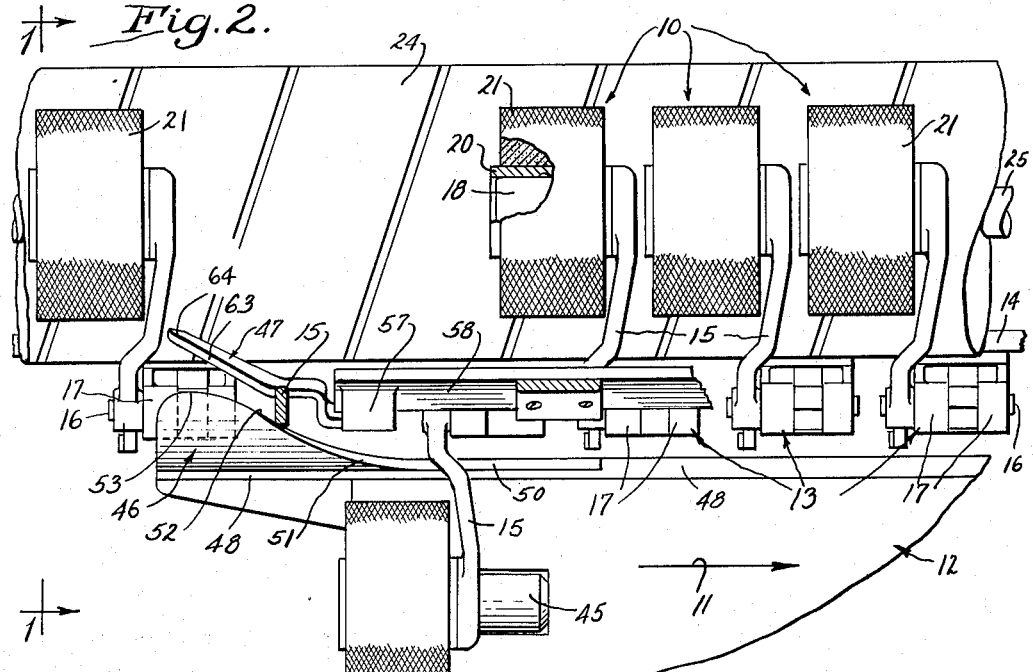
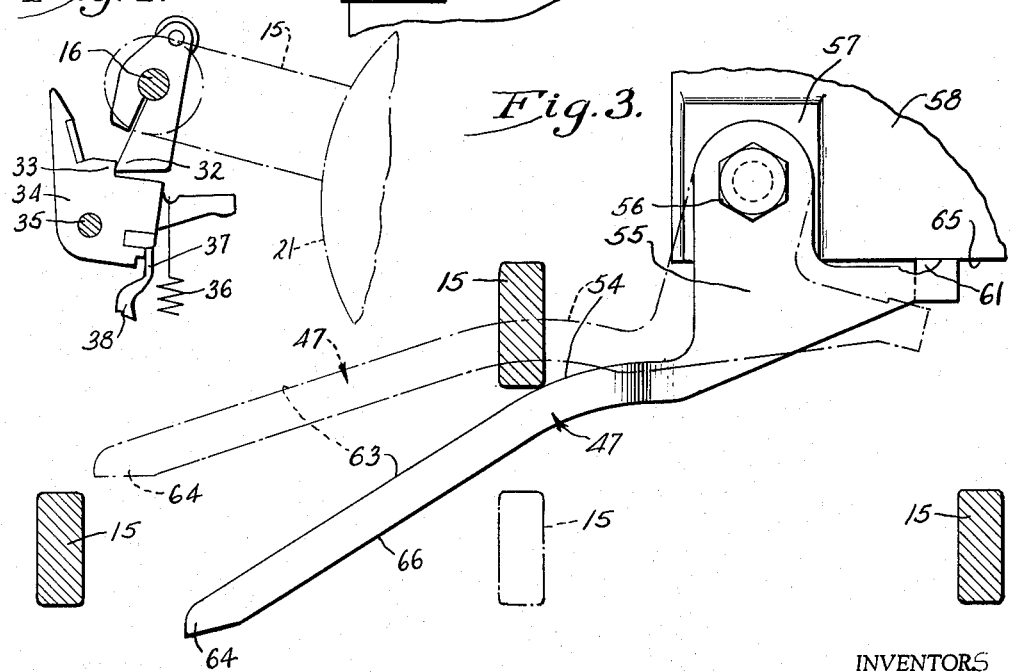
INVENTORS
Charles B. Crandall
and Harry G. Lind
BY Wolfe, Hubbard, Voit & Osann
ATTORNEYS INVENTORS
Charles B. Crandall
and Harry G. Lind
BY Wolfe, Hubbard, ...
ATTORNEYS United States Patent Office 3,251,561
Patented May 17, 1966

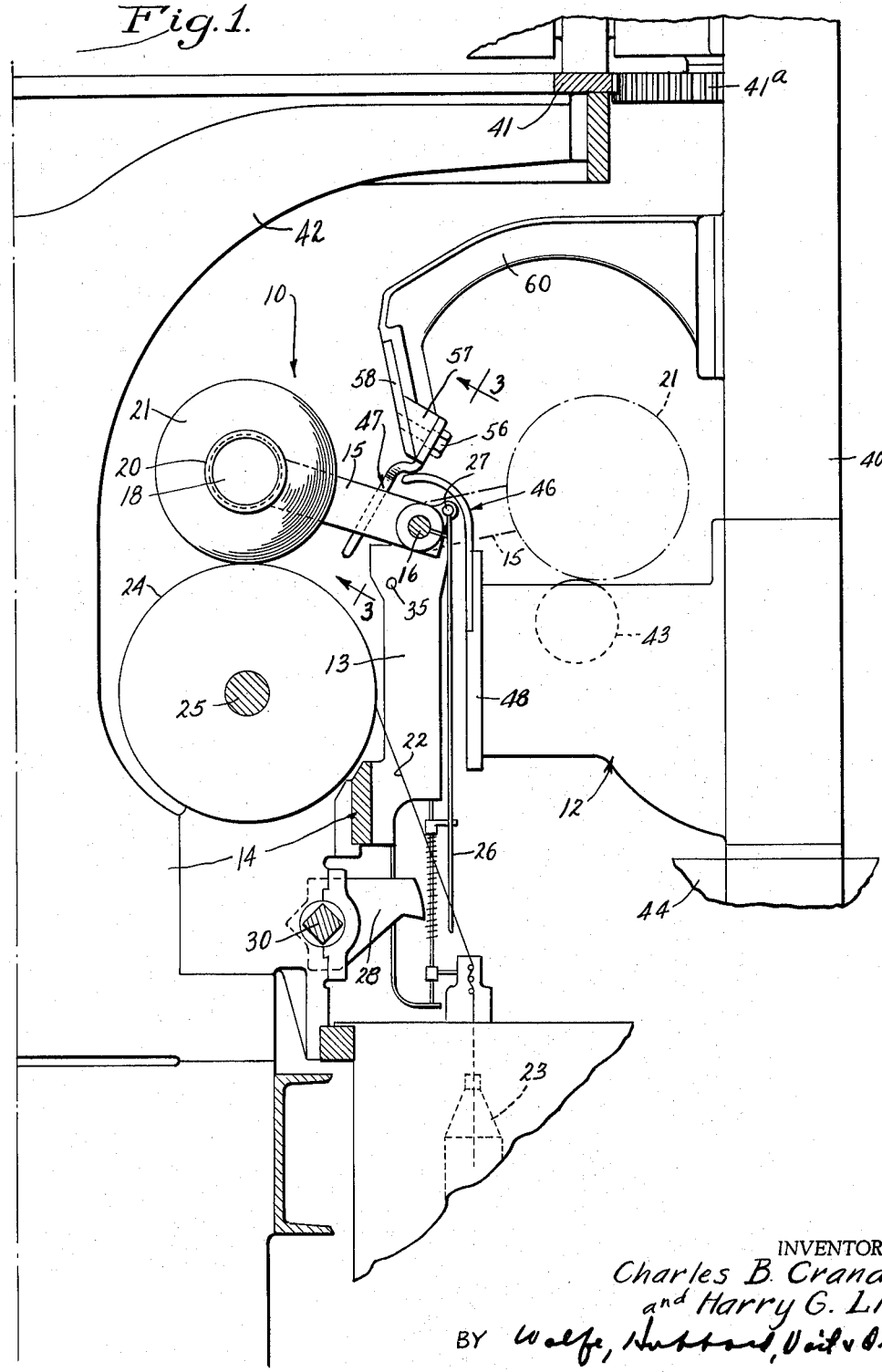

3,251,561
BY-PASS TYPE SPOOLER
Charles B. Crandall and Harry G. Lind, Rockford, Ill., assignors to Barber-Colman Company, Rockford, Ill., a corporation of Illinois
Filed Mar. 4, 1964, Ser. No. 349,434
6 Claims. (Cl. 242—35.5)

This invention relates to a Barber-Colman Type C spooler in which a so-called traveler moves around an endless path past successive winding units in each of which the cheese or cone on the free end of a rearwardly projecting arm is pressed down against a traversing drum during the winding. Upon breaking or exhaustion of the supply thread, the arm is swung upwardly and overcenter to horizontal idle position from which it is serviced by the traveler which operates to find the thread end on the cheese, tie on the thread of a new supply bobbin and swing the cheese arm upwardly and rearwardly back onto the traversing drum to resume the winding.

Such swinging is effected by a cam fixed to the traveler in a position to ride under the cheese arm and at the proper time swing the arm upwardly and overcenter onto a support which is carried by the traveler and inclined to let the cheese gradually down onto the winding drum in the continued and final movement of the traveler out of association with the winding unit.

The primary object of the present invention is to facilitate adaptation of a swinging arm type spooler of the above character for so-called by-pass operation in which the speed of the traveler is increased and the traveler operates only on the cheeses of the idle winding units while passing idly by those units in which the supply thread is running properly to the cheese. This is accomplished by disabling the let-down support above described as it passes the arm of a properly operating winding unit.

A more detailed object is to mount the let-down support for automatic upward yielding as it comes into engagement with the cheese arm of an active winding unit, the arm camming the support upwardly and riding idly under the latter as the traveler passes.

Other objects and advantages of the invention will become apparent from the following detailed description taken in connection with the accompanying drawings, in which FIGURE 1 is a vertical sectional view of a by-pass type spooler embodying the novel features of the present invention, the section being substantially along the line 1—1 of FIG. 2.

FIG. 2 is a fragmentary plan view.

FIG. 3 is a fragmentary section taken about on the line 3—3 of FIG. 1.

FIG. 4 is a fragmentary section taken in a plane extending transversely of the traveler path and before the traveler comes into operative association with the winding unit.

Figure 5:
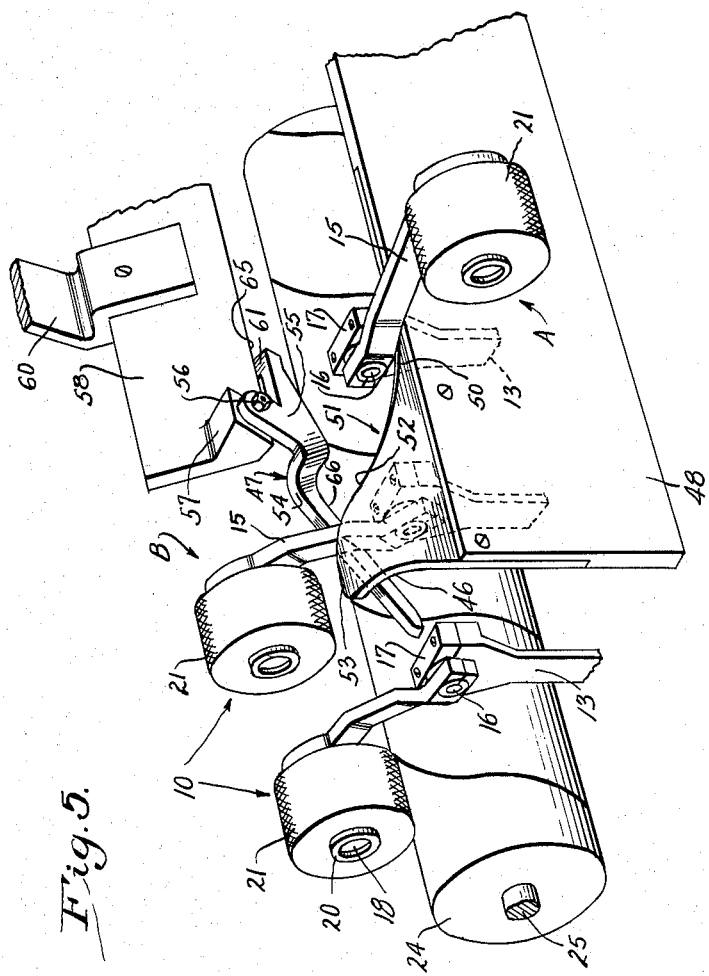
FIG. 5 is a fragmentary perspective view of the cheese arm elevating and let-down mechanism.

In the Type C spooler, a multiplicity of winding units 10 are arranged side by side along one side 11 of and within an endless path around which a so-called traveler or tender 12 moves and operates on idle ones of the units to resume winding thereby. Each unit is mounted on a bracket 13 upstanding from a frame 14 and includes an elongated arm 15 clamped at one end to a pivot shaft 16 which is journaled in bearings 17 at the upper end of the bracket. A spindle 18 projects laterally from the opposite or free end of the arm and rotatably supports the core 20 of a cheese or cone 21 onto which the thread 22 of a supply bobbin 23 is wound to form a package of the desired size. Such winding occurs while the supply thread remains unbroken with the cheese resting on the top of a continuously rotating drum 24 carried by a shaft 25 paralleling the traveler path. The drum is grooved to traverse the thread back and forth across the cheese. In the winding position, the arm 15 projects generally horizontally and rearwardly from its fulcrum as shown in full in FIG. 1.

When the thread being wound breaks or becomes exhausted, a pull wire 26 suspended from a short projection 27 on the hub of the cheese arm is swung rearwardly to carry its looped lower end into the path of a vertically oscillating arm 28 fast on a shaft 30 which is rocked up and down continuously. As a result of the downward pull, the cheese arm is swung upwardly from the winding position and overcenter past a vertical position from which the arm gravitates to the idle position shown in phantom in FIG. 1, the arm then projecting forwardly and generally horizontally from its fulcrum 16. The cheese arm is supported in this position by virtue of engagement as shown in FIG. 4 of an arm 32 fast on the hub of the cheese arm and a shoulder 33 on a bell-crank 34. The latter is fulcrumed at 35 on the bracket 13 and, at this time, urged by a spring 36 against the end 37 of an upstanding latch 38.

The traveler 12 for servicing each idle winding unit includes a frame 40 supported from an overhead track 41 on upstanding arms 42 of the machine frame. It is advanced along the path 11 by a power rotated gear 41ª meshing with rack teeth along the track. Arranged on the traveler along the path 11 of a Type C spooler and acting successively on the idle cheese and its arm 15 are a cam (not shown) for freeing the idle cheese from its support 32, 33, a breaking roll (not shown), an end finding roll 43, a knotter 44, a starting roll 45 and a cam 46 for raising the cheese arm upwardly and overcenter and a support 47 for letting the cheese arm down gradually to deposit the cheese onto the drum 24 and resume the winding of thread off from the new supply bobbin.

Herein, the elevating cam 46 comprises a curved plate secured at its lower edge to an upright bar 48 fixed to and extending along the frame of the traveler in a plane disposed between opposite ends of each cheese arm 15 when the latter is in its idle position shown at right in FIG. 5. The leading end 50 of an edge surface 51 on the cam plate is disposed below the level of an idle cheese arm so as to pass beneath the latter at the proper time in the advance of the traveler. The surface 51 then rises gradually and also curves rearwardly as indicated at 52 so as to engage the cheese arm and cam the latter upward progressively as indicated at A (FIG. 5) and overcenter before the time the trailing end 53 of the cam surface passes the cheese arm as indicated at B.

The support 47 for letting the cheese arm down to winding position extends longitudinally of the traveler path between opposite ends of the cheese arm in the winding position and is formed with an upper surface whose leading and trailing ends are respectively disposed above and below the lower edge of the arm in such position. Also, the position along the traveler is such that the leading end portion 54 is presented below the cheese arm as the latter moves overcenter while the remaining portion 63 slopes downwardly to the trailing end 64 which is disposed below the level of the arm 15 of a running winding unit irrespective of the size of the cheese thereon.

For purposes of the present invention, the support 47 takes the form of a lever comprising an elongated bar having a leading end portion 55 fulcrumed on a stud 56 which projects from a lug 57 on a plate 58 fixed to the lower end of an overhanging bracket 60 on the traveler frame. The lowermost and normal position of the support 47 is fixed in the present instance by engagement of a laterally projecting lug 61 on the end of the lever with the overlying lower edge 65 of the plate 58 as shown in phantom in FIG. 3 and in full in FIG. 5.

The support bar 47 projects rearwardly from the traveler along the path 11 and, when in its normal lower and fixed position, presents the surface 54 which slopes gradually and merges with the more sharply inclined surface 63 which extends to the trailing free end 64 of the lever. The length of the lever is such that the trailing end 64 passes beyond one cheese arm before the next adjacent arm to be associated with the traveler can be swung overcenter by the cam 46. As a result, each cheese arm in idle position is swung upwardly and overcenter by the cam 46 and then gravitates onto the support surface 54 along which it rides downwardly to the surface 63 which allows the arm to be lowered further and gradually until the cheese carried by the arm and regardless of the cheese size comes against the top of the winding drum 24. In the present instance, the trailing end portion of the support lever 47 bends toward the winding drum so that the point of engagement of the cheese arm and the let-down surface 63 moves along the arm and toward the cheese as the latter is lowered onto the drum.

To enable the traveler to by-pass the winding units that are running properly and without disturbing the positions of their rearwardly projecting cheese arms, the present invention contemplates a simple construction and mounting of the let-down support 47 to allow it to ride idly over the top of each cheese arm which is in winding position while the support is passing by. For this purpose, the support is urged downwardly and normally held in its lower and active position shown in full in FIG. 3 but mounted for upward movement by a camming action of the cheese arm itself to a position above the arm as shown in phantom in FIG. 3 while the arm remains in active winding position.

Preferably, the mounting is a simple pivot formed by the stud 56 above described and located at the leading end of the support so that the major and trailing length of the lever is free to swing upwardly in passing over the cheese arm and then to gravitate back to the normal lower position determined herein by engagement of the stop 61 and the plate 58. To utilize the cheese arm as a means for sensing when the let-down lever is to be swung upwardly, the underside of the forward end 55 of the lever is disposed on the traveler above the level of the cheese arm in winding position. From this end, the under surface 66 of the lever slopes downwardly substantially parallel to the upper cam surface 63 and terminates at the end which is disposed below the level of the cheese arms 15 when the latter are in winding position.

With the arrangement above described, it will be apparent that while the traveler is passing by each winding unit which is running properly with its cheese arm projecting rearwardly, the lever 47 will be disposed in its normal lower position so that its under surface 66 will come into engagement with the upper surface of the cheese arm. Then, the arm whose cheese is riding on top of the winding drum, will act as a cam as the surface 66 moves past thus rocking the trailing end portion of the lever upwardly and allowing the lever to ride over the top of the arm. Then, when the trailing end 64 passes the cheese arm, the lever swings downwardly and back to its normal position. As a result, the support 47 which normally functions to let the cheese arm of a newly serviced winding down onto the winding drum thereof is disabled when it encounters the arm of a properly operating winding unit. The latter is thus by-passed without disturbing its winding operation.

We claim as our invention:

1. In a by-pass type of spooler, the combination of, a winding drum rotatable about a horizontal axis for supporting and driving a thread package to wind thread thereon, an arm carrying said package at one end and fulcrumed at the opposite end to swing upwardly and overcenter in opposite directions about an axis paralleling the drum axis so as to carry the cheese between a winding position in which the arm projects horizontally in one direction and an idle position in which the arm projects horizontally in the opposite direction, a traveler movable transversely across said arm and operable on the cheese in said idle position to find the thread end, tie a new thread thereto and then engage the arm and swing the same upwardly and overcenter and toward said winding position, an elongated member on said traveler extending along the traveler path between opposite ends of the arm in winding position and normally disposed in a position to receive and support the arm in its movement beyond the overcenter position and toward said winding position and then let the arm down gradually in the continued advance of the traveler until the thread package thereon comes into driving contact with said drum, means supporting said member for movement upwardly to an inactive position above said arm when the latter is in winding position whereby to allow the member to pass by the arm, and means responsive to the advance of the traveler past said properly operating winding unit to effect movement of said member to said inactive position.

2. A by-pass spooler as defined in claim 1 in which said mounting means supports said member for upward yielding which is produced by a cam action resulting from engagement of said member and a part movable with the cheese arm.

3. A by-pass spooler as defined in claim 2 including an under surface on the member sloping downwardly from the leading end of the member and positioned for engagement between its ends with a cheese arm in winding position as the traveler passes by whereby the top surface of the arm cams the member upwardly as the under surface rides over the arm and the member passes idly by the latter.

4. A by-pass spooler as defined in claim 3 in which said member has a top surface disposed approximately parallel to said under surface of the member.

5. A by-pass type spooler as defined in claim 1 in which said member comprises a bar extending along the traveler path and fulcrumed on said traveler near the leading end of the bar for free downward swinging, said bar having top and bottom surfaces sloping downwardly and away from its fulcrum, and means on said traveler limiting the downward swinging of said bar to a position in which said arm in said winding position is in the path of said bottom surface whereby the bar swings upwardly and rides over the top of the arm as it passes the arm during the advance of the traveler.

6. A by-pass type spooler as defined in claim 5 in which said limiting means includes an abutment on the traveler engageable with said bar.

References Cited by the Examiner
UNITED STATES PATENTS

| | | | |
|---|---|---|---|
| 1,267,977 | 5/1918 | Colman | 242—35.6 |
| 1,268,684 | 6/1918 | Colman | 242—35.6 |
| 2,550,448 | 4/1951 | Brainerd et al. | 242—35.6 |

MERVIN STEIN, Primary Examiner.

STANLEY N. GILREATH, Examiner.